United States Patent [19]
Klein

[11] Patent Number: 5,263,693
[45] Date of Patent: Nov. 23, 1993

[54] TIERED DECOUPLER FOR IMPROVED HIGH FREQUENCY TUNING OF HYDRAULIC MOUNTS

[75] Inventor: Robert R. Klein, Centerville, Ohio

[73] Assignee: General Motors Corporation, Detroit, Mich.

[21] Appl. No.: 876,558

[22] Filed: Apr. 30, 1992

[51] Int. Cl.$^5$ ............................................. F16F 13/00
[52] U.S. Cl. .................................. 267/140.13; 267/219
[58] Field of Search ...................... 267/140.13, 140.14, 267/140.11, 219, 220, 140.12; 180/300, 312, 902; 248/562, 636, 638

[56] References Cited

U.S. PATENT DOCUMENTS

| | | | |
|---|---|---|---|
| 4,588,173 | 5/1986 | Gold et al. | 267/140.1 |
| 4,664,363 | 5/1987 | Gold et al. | 267/219 X |
| 4,708,329 | 11/1987 | Tabata et al. | 267/140.1 |
| 4,756,515 | 7/1988 | Kuroda et al. | 267/140.1 |
| 4,925,162 | 5/1990 | Kojima | 267/140.14 |
| 4,938,463 | 7/1990 | Miyamoto | 267/140.13 |

FOREIGN PATENT DOCUMENTS 60-188637A  6/1984  Japan.

Primary Examiner—Douglas C. Butler
Attorney, Agent, or Firm—Ronald L. Phillips; A. Michael Tucker

[57] ABSTRACT

The hydraulic mount assembly includes a hollow body connected to a pair of mounting members. A resilient diaphragm closes the hollow body thereby forming a closed cavity that is filled with damping liquid. A partition divides the cavity into primary chamber and secondary chambers. An orifice track and a decoupler passage are provided in the partition to communicate with both the primary and secondary chambers. A tiered decoupler is positioned for limited reciprocal movement in the decoupler passage. The tiered decoupler includes a plate, that is received and held for limited reciprocal movement within an annular groove in the partition. A pair of plungers that are interconnected by slide rods extending through apertures in the plate and reciprocate in tandem with respect to the plate. This relative reciprocal movement between the plate and plungers generates laminar flow around the decoupler during transition in response to high frequency vibrations for a reduced dynamic rate and smoother/quieter operation.

4 Claims, 2 Drawing Sheets

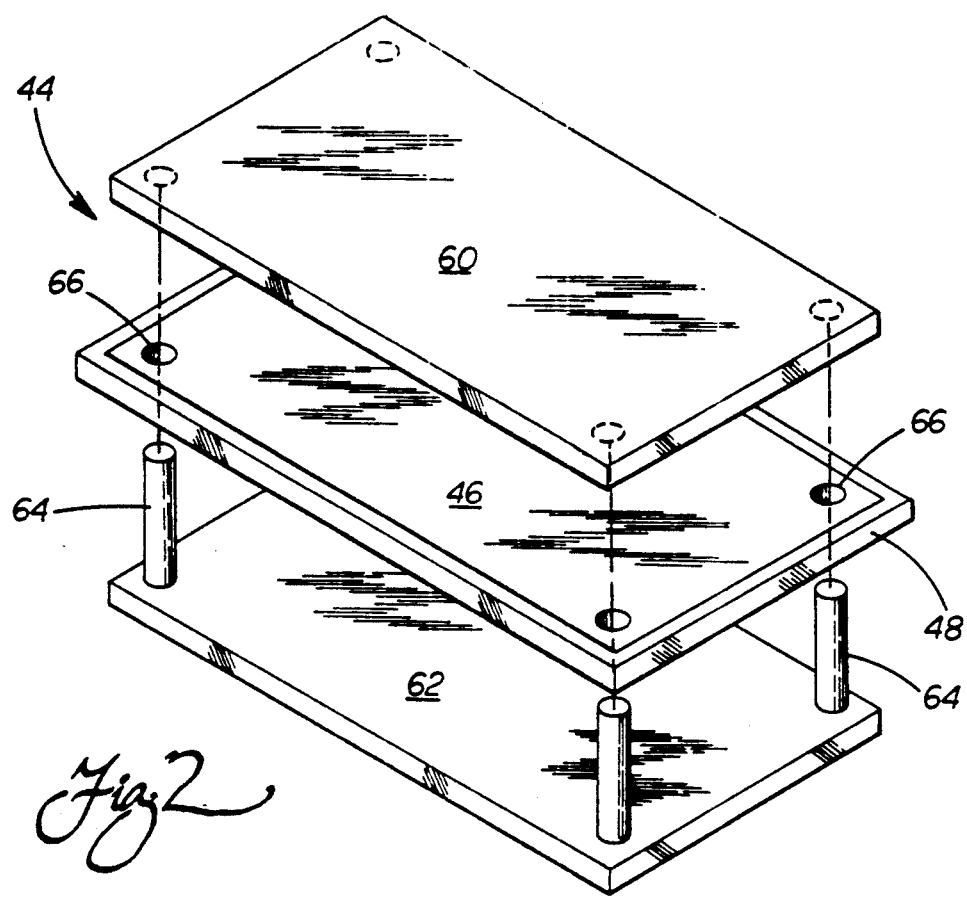
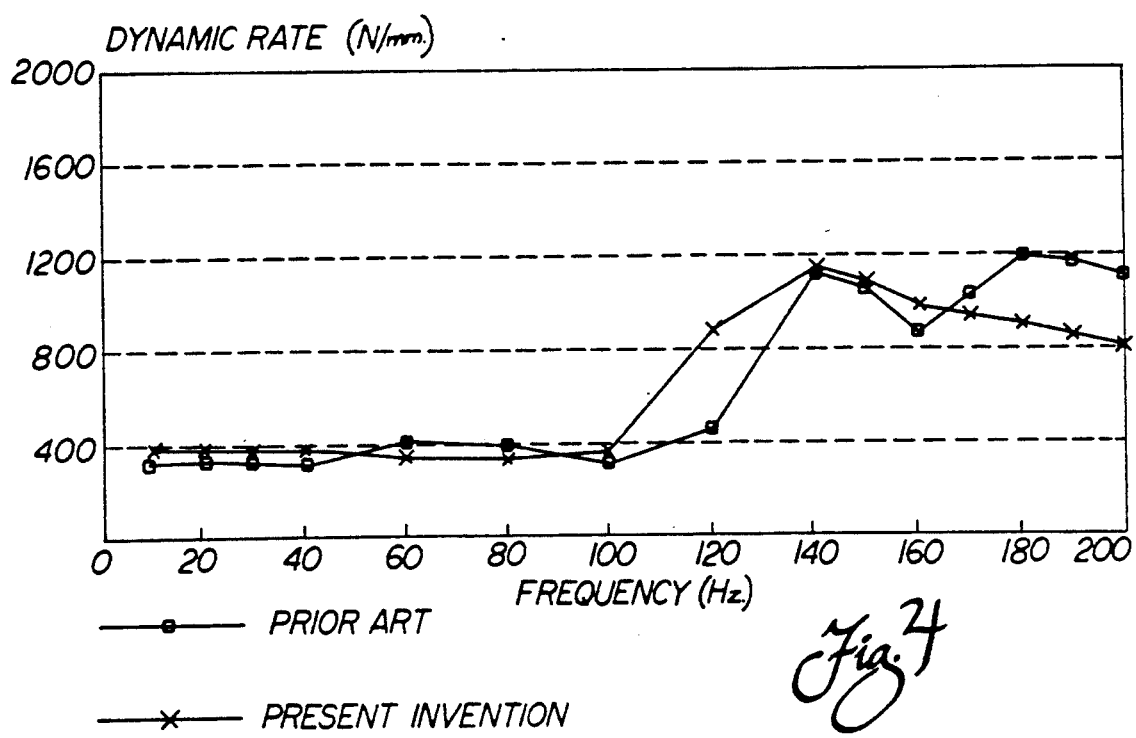

TIERED DECOUPLER FOR IMPROVED HIGH FREQUENCY TUNING OF HYDRAULIC MOUNTS

TECHNICAL FIELD

The present invention relates generally to hydraulic mounts for vibration damping and, more particularly, to a passive hydraulic mount assembly designed to provide improved tuning for isolating high frequency vibrations, while maintaining damping for controlling low frequency, large amplitude engine displacements.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al, issued May 13, 1986, entitled "Hydraulic-Elastomeric Mount" and assigned to the assignee of the present invention.

The hydraulic mount assembly of this prior invention includes a reinforced, hollow rubber body that is closed by a resilient diaphragm so as to form a cavity. This cavity is partitioned by a plate into two chambers that are in fluid communication through a relatively large central passage in the plate. The first or primary chamber is formed between the plate and the body. The secondary chamber is formed between the plate and the diaphragm.

A decoupler is positioned in the central passage of the plate and reciprocates in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes and generally higher frequencies, fluid flow between the chambers is substantially avoided and undesirable hydraulic damping is eliminated. In effect, this freely floating decoupler is a passive tuning device.

In addition to the relatively large central passage, an orifice track with a smaller, restricted flow passage is provided extending around the perimeter of the orifice plate. Each end of the track has an opening; one opening communicating with the primary chamber and the other with the secondary chamber. The orifice track provides the hydraulic mount assembly with another passive tuning component, and when combined with the freely floating decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. In contrast, large amplitude vibrating input, such as heavy engine loading during sudden accelerations or panic stops, produces high velocity fluid flow through the orifice track, and accordingly, a high level of damping force, and desirable control and smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler, smoothing the transition.

This basic mount design has proved quite successful and represents a significant advance over the prior art engine mounts, particularly of the solid rubber type. Specifically, hydraulic mounts provide a more favorable balance of load support and damping control. It should be appreciated, however, that additional improvement in operating characteristics is still possible. More particularly, it is desirable to provide a mount assembly with a reduced or soft dynamic rate over a selected range to minimize annoying relatively low amplitude/high frequency engine vibrations that would otherwise be transmitted to the passengers in the vehicle.

Present state of the art mount assemblies do not fully compensate for the change in the flow characteristics of the hydraulic fluid that is believed to take place at high frequencies. Specifically, the fluid flowing around the decoupler during switching of movement direction can change from laminar to turbulent flow. This occurs over a range of resonant high frequencies. As a result, fluid flow around the decoupler and through the decoupler passage at these frequencies is restricted reducing the mount's efficiency. Eventually, the flow is effectively choked off, killing the decoupling action. This may result in a significant intermittent pressure buildup in the primary chamber of the mount. Consequently, a very sharp increase in the dynamic rate characteristics of the mount is realized and vibrations are transmitted to the vehicle frame.

The resulting increase in stiffness in particular prevents effective noise suppression and isolation along this resonant range of low amplitude/high frequency vibrations. Thus, the prior art mounts may serve to transmit troublesome, intermittent bursts of noise through the frame of the vehicle to the passengers in the passenger compartment. Thus, a need is identified for a mount assembly exhibiting a reduced dynamic rate by maintaining transition flow around the decoupler in response to virtually all high frequency vibrations, while still maintaining the desired damping for low frequency control of engine displacements.

SUMMARY OF THE INVENTION

Accordingly, it is a primary object of the present invention to provide an improved hydraulic-elastomeric mount assembly overcoming the abovedescribed limitations and disadvantages of the prior art.

A more specific object of the present invention is to provide a fully passively tuned hydraulic mount assembly exhibiting significantly improved high frequency tuning characteristics while maintaining the desired damping for control of high amplitude, low frequency vibrational inputs.

Still another object of the present invention is to provide an improved hydraulic mount assembly incorporating a novel decoupler construction that advantageously provides a lower coefficient of drag than previously employed arrangements. Accordingly, smoother more efficient, transitional fluid flow is provided even at relatively higher vibrational frequencies. This results in improved flow through the decoupler opening and, therefore, a mount of reduced dynamic rate at these higher frequencies. This relatively soft mount around the troublesome range of frequencies advantageously reduces the transmission of mechanical vibration, including noise. The end result is greater satisfaction of the passengers with respect to the smooth ride characteristics of the vehicle.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved hydraulic mount assembly for an operating component of a vehicle is provided. The mount assembly is particularly adapted to produce the desired improved damping response for control of high amplitude vibrations, as well as the desired dynamic rate for isolation of vibration and noise as required over the broad range of operating conditions. Accordingly, smoother, quieter vehicle operation is provided.

The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid-filled cavity into two distinct chambers. The primary chamber is formed between the partition and the interior wall of the hollow body. The secondary chamber is formed between the partition and the interior wall of the diaphragm.

The partition further includes an orifice track and a decoupler passage for providing fluid communication between the primary and secondary chambers. A decoupler is held for limited reciprocating movement within the decoupler passage by an annular groove or cavity formed in the side walls of the passage.

According to an important aspect of the present invention, the decoupler is of a unique dual section, tiered design wherein relative movement is provided between the sections. In effect, the tiered decoupler relies upon the fluid dynamics effect known as "drafting" to provide a significantly reduced coefficient of drag (Cd) during transition flow.

More particularly, the tiered decoupler incorporated in the mount assembly of the present invention provides a Cd of approximately 1.0. In contrast, a standard decoupler of the plate type as disclosed in, for example, U.S. Pat. No. 4,664,363 to Gold et al., provides a Cd of approximately 2.05. Advantageously, the reduction in the Cd characteristic of the tiered decoupler of the present invention allows smoother more efficient, less turbulent flow around the decoupler and through the decoupler passage between the primary and secondary chambers. This smooth consistent transition flow is maintained up to and beyond vibration frequencies of 200 Hz.

Advantageously, the improved flow through the decoupler passage at these higher frequencies serves to reduce the dynamic rate of the mount. Accordingly, the hydraulic mount assembly of the present invention provides significantly enhanced isolation of these high frequency vibrations. Further, the tiered decoupler effectively smooths the dynamic rate curve and provides a softer transition from frequency to frequency. Additionally, the amount of noise transmitted through the mount assembly to the vehicle frame and eventually the passengers within the vehicle is reduced over a broader frequency band as a result of the relatively increased range of the "soft" mount.

The tiered decoupler includes a first section, in the form of a decoupler plate, that is captured within the annular groove of the decoupler passage through the partition. Sufficient clearance is provided between the groove and perimeter of the plate to allow for limited reciprocal movement within the passage.

The second section comprises a pair of interconnected, cooperating plate-like plungers. These dual plungers are disposed adjacent the opposing faces of the decoupler plate of the first section; i.e. one plunger is provided in the passage adjacent the primary chamber and another plunger is provided adjacent the secondary chamber. The plungers are connected for operation in tandem by means of a series of spaced slide rods. Preferably, four slide rods are provided; one rod extending between each of the corresponding corners of the plungers.

The plungers are maintained in alignment with the plate and move relative thereto by being held captive in cooperating apertures in the corners of the decoupler plate. The apertures have a slightly larger cross-sectional area than the cross-sectional area of the rods so as to provide clearance for substantially free sliding movement. Further, the slide rods are of sufficient length to allow effective reciprocation between the plungers and decoupler plate. The range of reciprocation may, for example, be approximately 6.0 mm.

It is the relative movement provided between these over and under plungers and the decoupler plate of the tiered decoupler that allows it to take advantage of the fluid dynamics effect, known as drafting. More particularly, the two plungers operating in tandem are at a constantly changing distance from the decoupler plate as the pressures in the chambers vary. The drafting occurs as the "leading" plunger moving away from the plate creates a low pressure region which literally sucks the hydraulic fluid around the plate and across the groove. Simultaneously, the "trailing" plunger is pushing fluid around the plate and across the groove to thereby provide smooth and highly efficient flow.

In accordance with the drafting effect, this plunger action is effective to prevent fluid stalling and turbulence, thus establishing laminar flow around the decoupler plate during movement in either direction. The increased velocity of the flow caused by this drafting effect maintains the laminar flow over a substantially increased range of frequencies.

This laminar flow in effect establishes the lower drag coefficient in the decoupler passage, and in turn this causes more smoothing of the fluid flow around the decoupler plate and through the decoupler passage. To put it another way, fluid flow does not become turbulent and restricted, or ultimately choked off in the operative range of frequencies, as is prevalent with prior art decoupler designs. Accordingly, the mount assembly exhibits a reduced dynamic rate and relatively soft operating characteristics for isolation of high frequency vibration, and particularly associated noise.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is an exploded perspective view in detail of the tiered decoupler shown in FIG. 1;

FIG. 4 is a graphical representation showing how the dynamic rate in terms of mount dynamic rate is reduced at high frequencies in comparison with a decoupler of standard design, such as shown in U.S. Pat. No. 4,664,363 to Gold et al.

Reference will now be made in detail to the present preferred embodiment of the invention, an example of which is illustrated in the accompanying drawing.

DETAILED DESCRIPTION OF THE INVENTION

Figure 1:
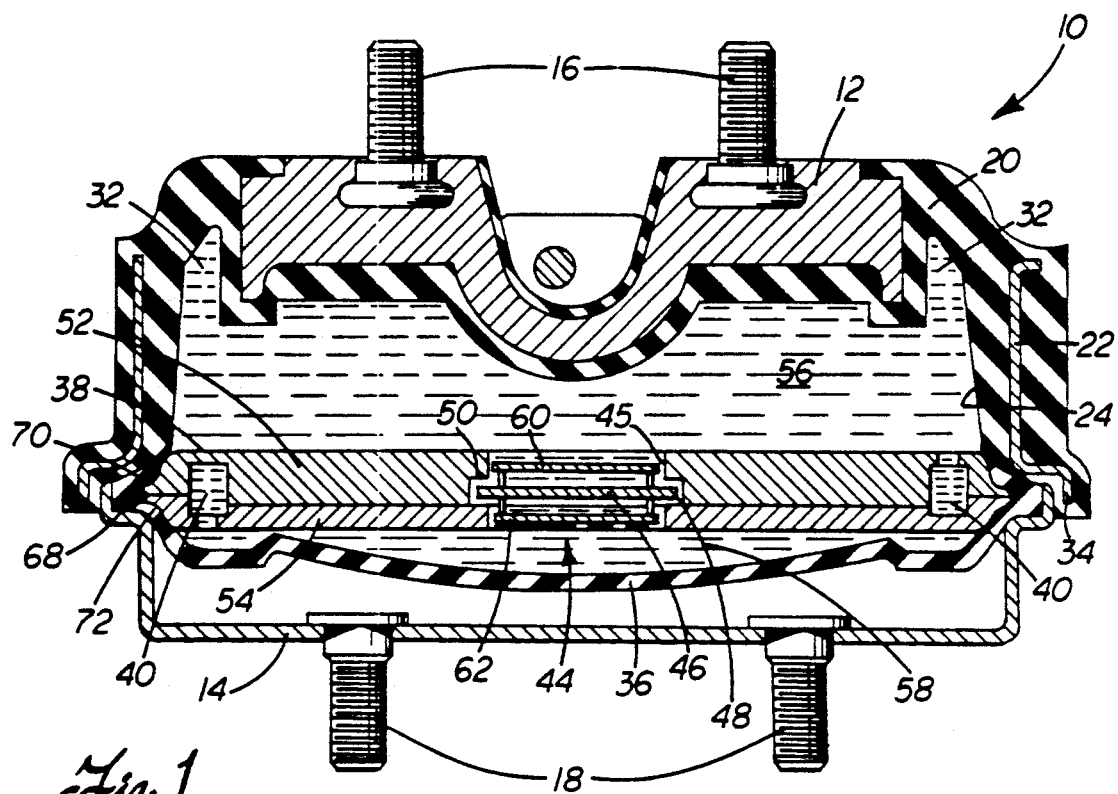
FIG. 1 is a cross-sectional view of the hydraulic mount assembly of the present invention incorporating a novel tiered decoupler.

Reference is now made to drawing FIG. 1 showing the improved hydraulic-elastomeric mount assembly 10 of the present invention. The mount assembly 10 is particularly adapted for mounting an internal combustion engine (and/or transmission) in a vehicle. The dynamic characteristics of the mount assembly 10 may be tuned to meet the operational parameters and needs of the specific application. As a result, the desired dynamic rate best suited to isolate a particular range of vibration/noise conditions may be obtained. Simultaneously, the desired damping to provide the necessary control of large amplitude vibrational inputs is also provided.

The mount assembly 10 includes a cast aluminum mounting member 12 and stamped sheet metal mounting member 14. The mounting members 12 and 14 each have a pair of studs 16, 18 respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body may be molded to and about the mounting member 12 and to both the interior and exterior of an oval shaped stamped sheet metal retainer 22.

The body 20 is configured to form a hollow cavity 24 for receiving a damping liquid, such as a commercial engine antifreeze coolant. Voids 32 are provided in the body 20. These voids 32 assist in providing directional dynamic rate control within the elastomeric body 20 and are part of the damping liquid cavity 24. As is known in the art, such voids 32 are especially useful in isolating certain internal combustion engine vibrations.

Together, the mounting member 12, elastomeric body 20 and metal retainer 22 form a first subassembly or cover of the mount assembly 10. The retainer 22 includes an outwardly projecting collar 34 at its lower periphery. The collar 34 is formed to receive a second subassembly or base. The second subassembly comprises the mounting member 14 and elastomeric diaphragm 36 of natural or synthetic rubber and a partition 38. An orifice track 40 in the partition 38 provides damping liquid flow between the two chambers of the cavity 24 (see FIG. 1). As will be described in more detail below, a decoupler 44 is captured for limited reciprocal movement within a passage 45 in the partition, generally aligned in the center of the mount assembly 10. In this central position, the decoupler responds rapidly to dynamic pressure fluctuations in the fluid caused by vibrational inputs from the operating component being mounted in the vehicle. The orifice track 40 extends around the central passage 45 so that the fluid flow during damping of low frequency vibrations does not interfere with the fluid flow through the decoupler passage 45. As indicated, the decoupler 44 and the passage 45, are principally designed and tuned for alleviation of mount stiffness and reduction in dynamic rate during high frequency vibration.

The decoupler 44 is of tiered construction. More particularly, it includes two sections, best shown in FIGS. 2 and 3A-C. The first section is in the form of a rectangular plate 46. An elastomeric sealing and cushioning ring 48 formed of natural or synthetic rubber may be molded around the periphery of the plate 46. As best shown in FIG. 1, the plate 46 is mounted for limited, up and down or reciprocal movement in an annular groove 50 formed at a midpoint along the passage 45 within the partition plates 52, 54. The respective upper and lower faces of the plate 46 are directly engaged by the damping liquid in the primary and secondary chambers 56, 58, respectively.

The second section of the decoupler 44 includes a pair of spaced, interconnected plungers 60, 62. As shown, the dual plungers 60, 62 are interconnected by four slide rods 64 to provide for tandem operation. The rods 64 extend through four cooperating apertures 66 provided in the plate 46. Advantageously, the apertures 66 serve as guides to maintain the alignment of the two sections of the tiered decoupler 44; that is, the plate 46 remains axially aligned along the passage 45 and with the plungers 60. Further, sufficient clearance is provided to allow substantial relative reciprocal motion in the axial direction between these sections. That reciprocal motion may, for example, be limited to approximately 6.0 mm. The range of the axial motion may, however, be adjusted by providing shorter or longer rods 64 to furnish the desired tuned characteristics. The operation of the decoupler 44 is described in greater detail below.

The elastomeric diaphragm 36 includes an annular rim section 68 having a radially inwardly facing internal groove formed between upper and lower shoulders 70, 72, respectively. The shoulders 70, 72 are flexible so as to sealingly receive the periphery of the partition 38.

The lower mounting member 14 is formed with an extension to receive the rim 68 of the diaphragm 36. This extension of the mounting member 14 fits within the collar 34 of the retainer 22. As is known in the art, tabs (not shown) may be provided on the collar 34 and bent over to retain the whole mount assembly together. The elastomeric diaphragm 36 closes the elastomeric body 20 so as to form therewith the closed damping cavity 24. This cavity 24 is divided by the partition 38 into the primary chamber 56 (enclosed by the elastomeric body 20), and the secondary chamber 58 (enclosed by the diaphragm 36).

The partition 38 is formed of die-cast metal (as shown) or may be plastic; and includes the partition plates 52, 54 that have matching peripheries. These plates 52, 54 span the cavity and cooperate to define the orifice track 40 interconnecting the chambers 56, 58. Openings in opposite directions are provided at the ends of the orifice track 40 to provide communication, respectively, with the primary chamber 56, and the secondary chamber 58. Of course, the orifice track 40 may be formed to a selected length and/or width so as to provide the mount with desired passive and low frequency tuned damping characteristics.

In operation, when the hydraulic mount assembly 10 is subjected to low frequency, relatively large amplitude vibration, one of the dual plungers 60, 62 of the second section of the tiered decoupler 44 is rapidly forced into engagement with and held against the plate 46. Further, the plate 46 is rapidly forced in the same direction and held in its seated position against the partition plates 52, 54. This effectively blocks fluid flow through the central decoupler passage 45. As a result damping fluid is forced to flow between the primary and secondary chambers 56, 58 only through the orifice track 40. At these low frequencies, such as below 20 Hz, the fluid flow through the track 40 provides a passively tuned damping effect in accordance with the designed resonance of the column of liquid in the track. The increased resistance to flow along the orifice track 40, along with the inertial effects of the liquid column, provide this proven, tuned damping action.

In contrast, the tiered decoupler 44 acts as a passive tuning component that effectively eliminates hydraulic damping for high frequency, low amplitude engine vibrations generated during vehicle operation, such as during normal idling. Specifically, the decoupler 44, provides reciprocating movement in response to alternating rapid pressure buildups in the chambers 56, 58 acting on opposite faces of the decoupler. This reciprocating movement of the decoupler 44 toward and away from the chambers 56, 58 produces a limited volume change in the chambers, that in effect establishes hydraulic decoupling.

More specifically, when the hydraulic mount assembly 10 is subjected to low amplitude, high frequency vibrational inputs, the combined decoupler 44, including both the plate 46 and the tandem acting plungers 60, 62, freely reciprocate in the partition 38. This action allows fluid to pass through the passage 45 and across the annular groove 50 so as to partially bypass the decoupler 44. This fluid flow through the decoupler passage 45 between the chambers 56, 58 smooths the transition of decoupler movement in both directions. Accordingly, rapidly increasing fluid pressure in the chambers 56, 58 is relieved, and flow through the orifice track 40 is effectively prevented. As a result, no damping takes place across the desired range of high frequency vibration.

In prior art mount designs, as mentioned above, it has been found that with increasing vibrational input frequencies, fluid flow characteristics around the decoupler change from laminar to turbulent. These changing characteristics restrict, and choke off, flow through the decoupler passage 45, thus eventually blocking flow. As a result, alternate rapid pressure buildup or spiking occurs in the chambers 56, 58 of the mount assembly, thereby generating an undesirable increase in the dynamic rate and stiffness of the mount. In fact, the dynamic rate of a prior art mount assembly is known to increase rapidly, by as much as 50 to 200%. This increase in turbulence and dynamic rate adversely affects the ability of the mount assembly 10 to suppress certain low to middle amplitude, high frequency displacements common during vehicle operation, such as during engine idle or normal highway operation. These vibrations thus cause deleterious second order resonant, vertical shaking forces that can be felt in the passenger compartment.

In order to maximize passenger comfort and as set forth with respect to the concept of the present invention, these high frequency vibrations can now be isolated. The unique operation of the tiered decoupler 44 provided in the present mount assembly 10, achieves this end. More particularly, the tiered decoupler 44 takes advantage of the fluid dynamics effect, known as drafting, to significantly reduce the Cd of the decoupler. More particularly, the Cd is lowered by a full 50% or more from the standard state of the art single decoupler plate designs described above. As a result, not only is physical shaking prevented, but the characteristic accompanying noise is substantially reduced.

Figure 3A:
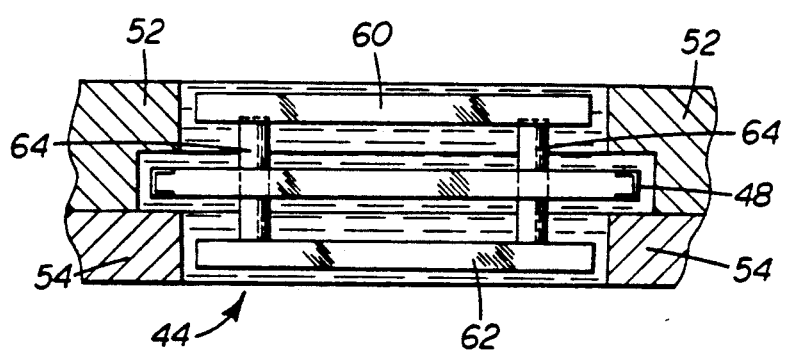
FIG. 3A is a cut-away, detailed side elevational view of the tiered decoupler in the rest position.
Figure 3B:
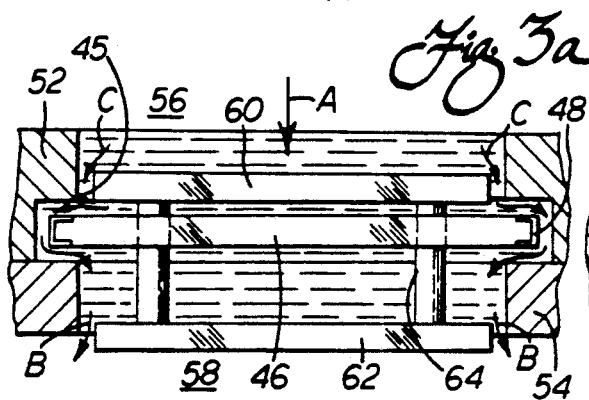
FIGS. 3B and 3C are cut-away views similar to FIG. 3A but showing the decoupler in two distinct operative positions.

The operation of the decoupler 44 is best illustrated starting with reference to FIG. 3B. When the hydraulic mount assembly 10 is subjected to a force compressing the elastomeric body 20 and, therefore the overlying primary chamber 56, fluid is forced to flow through the decoupler passage 45 in the direction of action arrow A and toward the secondary chamber 58. As the fluid begins to flow through the passage 45 and across or around the annular groove 50 to bypass the decoupler plate 46, the second section of the decoupler, that is the tandem plungers 60, 62, are displaced relative to said plate (also in the direction of action arrow A; compare FIGS. 3A and 3B). The relative movement of the lower or "leading" plunger 62 forms a low pressure area on the underneath side of the plate 46. This low pressure area serves to suck or draw fluid through the passage 45 and across the annular groove 50 from the primary chamber 56 (note action arrows B), by drafting.

Simultaneously, the relative movement of the upper or "trailing" plunger 60 serves to positively pump fluid from the primary chamber 56 through the passage 45 and across the annular groove 50; that is, around or bypassing the plate 46 and directly into the secondary chamber 48 (note action arrows C). Accordingly, fluid flow through passage 45 between the chambers 56, 58 is positively enhanced and, therefore, a greater volume of fluid is moved through the passage in a shorter period of time. As a result, fluid flow during high frequency vibrational inputs is more easily transferred between the chambers, and thus accommodated. Further, this smooth, laminar flow across the groove 50 and around the decoupler plate 46 is maintained during transitions in movement of the decoupler 44 in both directions, in order that these high frequency induced, pressure spikes are fully isolated.

Figure 3C:
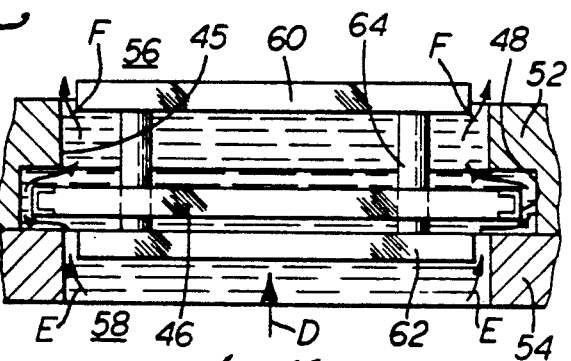

More particularly, upon reversal of force, the primary chamber 56 expands and the stretched diaphragm 36 contracts, forcing hydraulic fluid in the opposite direction (see action arrow D) past the annular groove and around the decoupler plate 46. As this occurs, the tandem plungers 60, 62 move relative to decoupler plate 46 in the direction of flow depicted by action arrows E, as shown in FIG. 3C. The drafting effect is again initiated, as described above, with fluid being simultaneously drawn and pumped around the decoupler plate 46 and into the chamber 56 (see action arrows F). Advantageously, the positive forces to which the fluid flow is subjected through this drafting effect, prevent turbulence and stalling of the fluid, and thus a more orderly laminar flow through all transition periods occurs, that is to say as long as the decoupler plate 46 remains unseated.

Advantageously, it should thus be appreciated that by inducing drafting, and in effect reducing the Cd, more efficient and smoother fluid flow is provided at the troublesome, resonant higher frequencies than has been heretofore possible with prior art decoupler designs By reducing turbulence, flow restriction is avoided at these higher frequencies, particularly during transitional movement of the decoupler and, accordingly, pressure buildups and spiking are relieved. As a result, the dynamic rate of the mount assembly is effectively reduced at higher frequencies up to and beyond 200 Hz. Accordingly, the mount assembly 10 of the present invention can be said to exhibit relatively soft characteristics, that is desirable for passenger comfort. Of significant importance in this respect is the manner in which the mount effectively reduces the transmission of noise at these high frequency ranges. This is particularly significant during engine idle and when the vehicle is not moving, and there are no outside forces being generated, so that engine control is of little concern.

The reduction in the dynamic rate, and thus stiffness, of the mount assembly 10 of the present invention is best appreciated from viewing FIG. 4. This figure graphically compares dynamic rate versus frequency for a hydraulic mount assembly of the type disclosed in U.S. Pat. No. 4,664,363 to Gold et al. with the same parameters of a hydraulic mount assembly of the present invention incorporating the tiered decoupler 44. A −1200N preload and a vibration amplitude of ±0.1 mm is plotted. As shown, the mount built in accordance with the Gold et al. patent, including a single plate-like decoupler, provides a relatively flat dynamic rate to a frequency of 100 Hz. From there the dynamic rate gradually rises to a first peak at 140 Hz. There is a dip in the rate at 160 Hz and then a rise to a second peak at 180 Hz.

In contrast to this Gold-type mount, the mount assembly 10 of the present invention with the tiered decoupler 44 substantially parallels its performance to 160 Hz. However, where the dynamic rate of the Gold-type mount rises to a second peak at 180 Hz, the present mount assembly 10 continues a performance trend downwardly from 140 Hz; that is, a favorable dynamic rate of 800 N/mm is obtained versus a dynamic rate of approximately 1100 N/mm for the Gold-type mount. This reduction in dynamic rate represents a significant softening (i.e. approximately 28%) of the mount characteristics allowing significant improvement in the isolation of vibrations/noise discernible to passengers in the vehicle.

Further, it should be appreciated that the curve plotted for the mount assembly 10 of the present invention is smoother overall, and particularly in the traditionally troublesome frequency range between 140 and 200 Hz. Thus, clearly improved, high frequency performance characteristics are provided by the present mount assembly 10. As explained, this is obtained due primarily to improvement in the transition characteristics of the dual section decoupler 44. In turn, the overall operating performance rating is enhanced making for increased customer satisfaction by providing a smoother, quieter and more consistent feeling ride to the driver.

In summary, numerous benefits result from employing the concepts of the present invention. The hydraulic mount assembly 10 utilizes a passive tuning system and, more particularly, a novel dual section, tiered decoupler 44. This decoupler 44 imposes a low coefficient of drag characteristic to the passage 45 that smooths the flow of damping fluid around the decoupler, particularly in transition, especially at relatively high frequency inputs up to and above 200 Hz. Accordingly, flow through the decoupler opening remains relatively unrestricted, thereby reducing the dynamic rate of the mount assembly 10. In effect, a better tuned performance is obtained for better isolation of troublesome high frequency vibration and noise suppression.

The foregoing description of a preferred embodiment of the invention has been presented for purposed of illustration and description. It is not intended to be exhaustive or to limit the invention to the precise form disclosed. Obvious modifications or variations are possible in light of the above teachings. For example, it is possible to further lower the coefficient of drag of the tiered decoupler 44 by forming the plungers 60, 62 from shapes inherently having low coefficients of drag, such as hexagons, circles and ellipses. It is believed the embodiment chosen and described provides the best illustration of the principals of the invention and its practical application, to thereby enable one of ordinary skill in the art to utilize the invention in various embodiments and with these and various other modifications, as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly for isolation of high frequency vibrations of an operating component of a vehicle during operation, comprising:
   a pair of mounting members;
   a hollow body connected to said mounting members;
   a resilient diaphragm closing said hollow body and forming therewith a closed cavity that is filled with a damping liquid;
   means for partitioning said cavity into a primary chamber and a secondary chamber enclosed by said diaphragm;
   an orifice track in said partitioning means providing fluid communication between said primary and secondary chambers; and
   a decoupler received for reciprocal movement between said primary and secondary chambers in a passage in said partitioning means, said decoupler being characterized by;

a plate captured within an annular groove in said partitioning means and allowing limited reciprocal movement relative thereto;

a pair of plungers connected together, one plunger being disposed adjacent each of the opposing faces of said plate; and means for providing relative sliding movement between said plate and said plungers to generate laminar flow around said decoupler during transition in response to said high frequency vibrations;

whereby reduced dynamic rate of said mount assembly is provided for a smoother and quieter operation of the vehicle.

2. A hydraulic mount assembly for isolation of high frequency vibrations of an operating component of a vehicle during operation, comprising:

a pair of mounting members;

a hollow body connected to said mounting members;

a resilient diaphragm closing said hollow body and forming therewith a closed cavity that is filled with a damping liquid;

means for partitioning said cavity into a primary chamber and a secondary chamber enclosed by said diaphragm;

an orifice track in said partitioning means providing fluid communication between said primary and secondary chambers; and a decoupler received for reciprocal movement between said primary and secondary chambers in a passage in said partitioning means, said decoupler being characterized by;

a plate captured within an annular groove in said partitioning means and allowing limited reciprocal movement relative thereto;

a pair of plungers connected together, one plunger being disposed adjacent each of the opposing faces of said plate; and a plurality of slide rods for interconnecting said pair of plungers for movement in tandem and apertures extending through said plate for freely slidably receiving said rods for relative movement to generate laminar flow around said decoupler during transition in response to said high frequency vibrations;

whereby reduced dynamic rate of said mount assembly is provided for a smoother and quieter operation of the vehicle.

3. The hydraulic mount assembly set forth in claim 2, wherein said decoupler provides a coefficient of drag of 1.5 or less within said passage and across said groove, whereby still more efficient fluid flow in transition at higher velocities is provided and a further reduced dynamic rate at higher frequencies is provided.

4. The hydraulic mount assembly set forth in claim 2, wherein total relative movement allowed between said plate and said plungers is approximately 6.0 mm.

* * * * *